Dec. 27, 1966 F. B. LASECK ETAL 3,294,518
APPARATUS FOR TEMPERING BENT GLASS SHEETS
Filed July 19, 1963 3 Sheets-Sheet 3

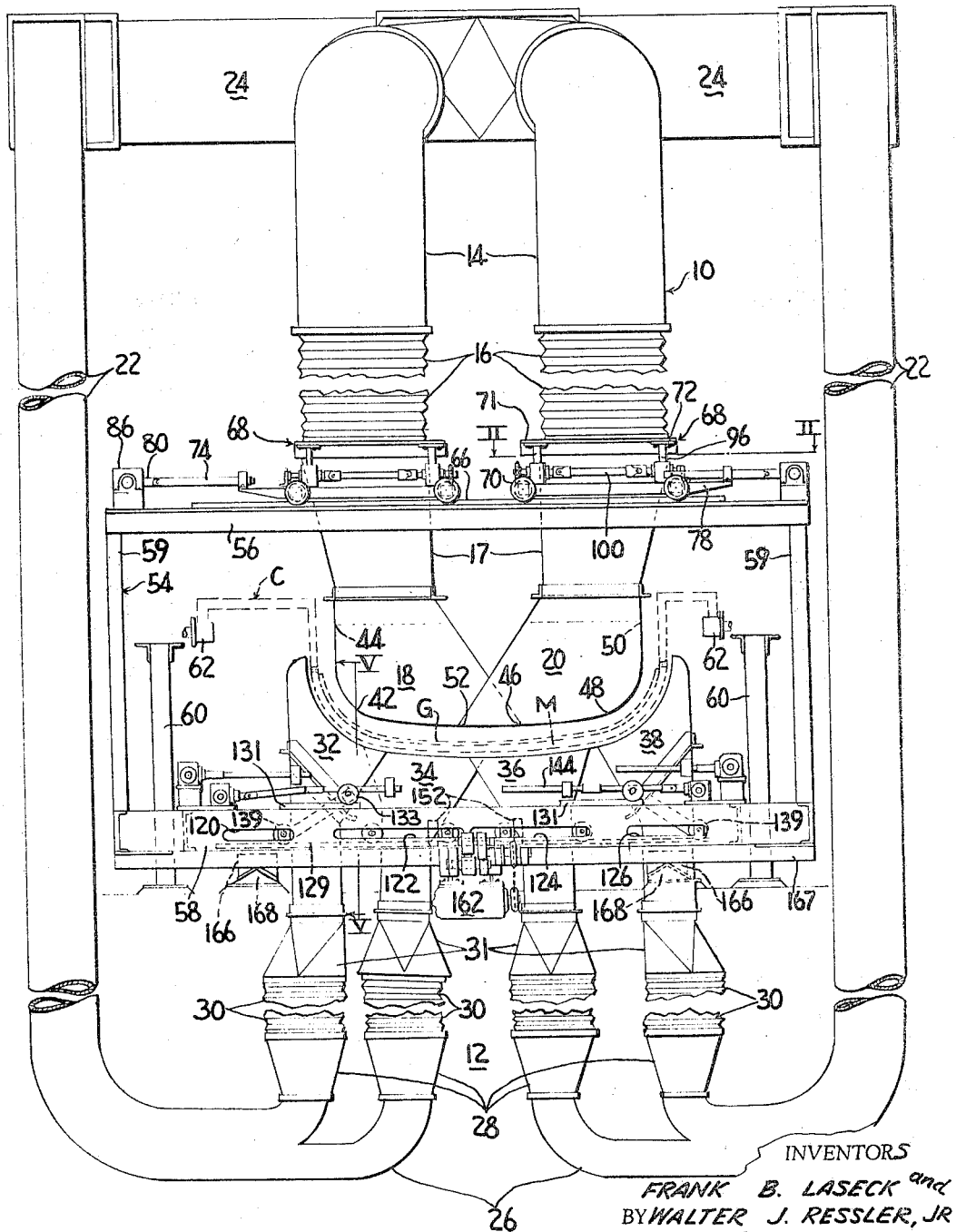

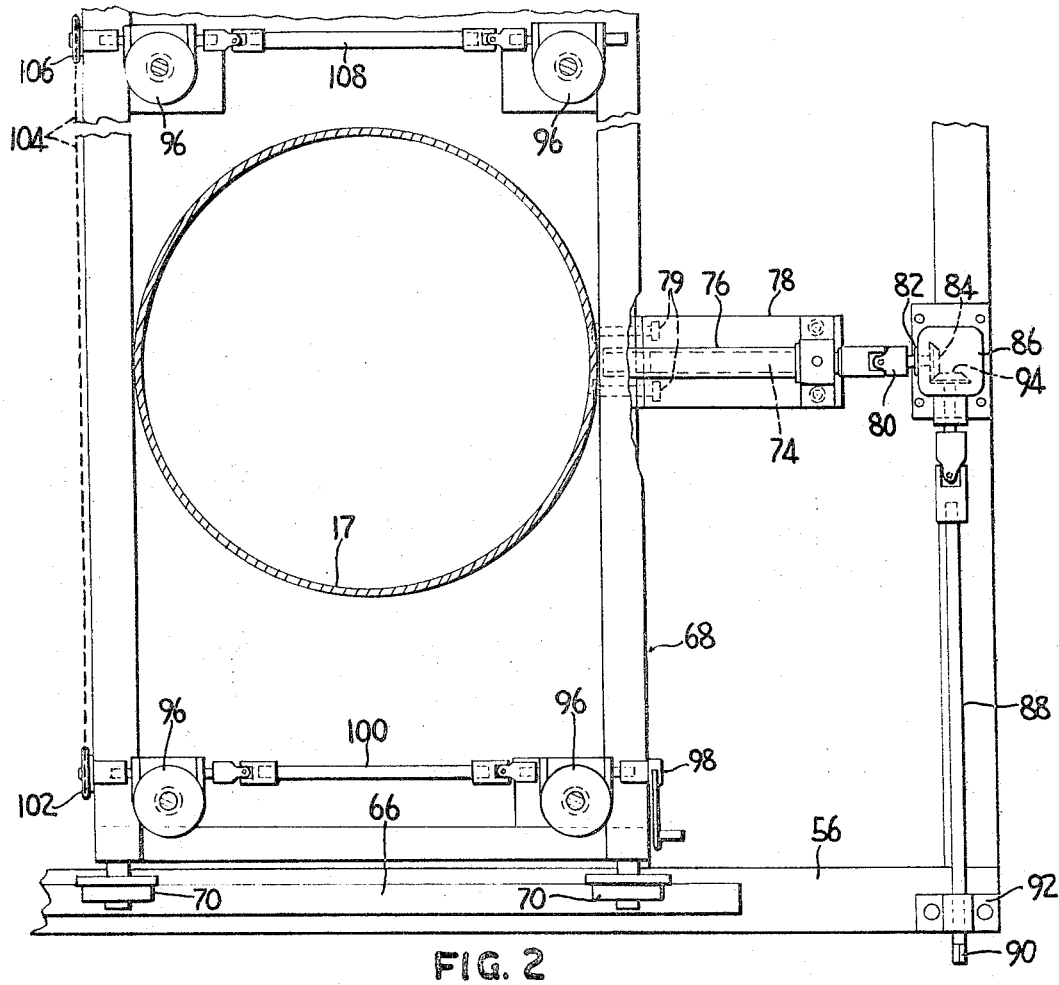
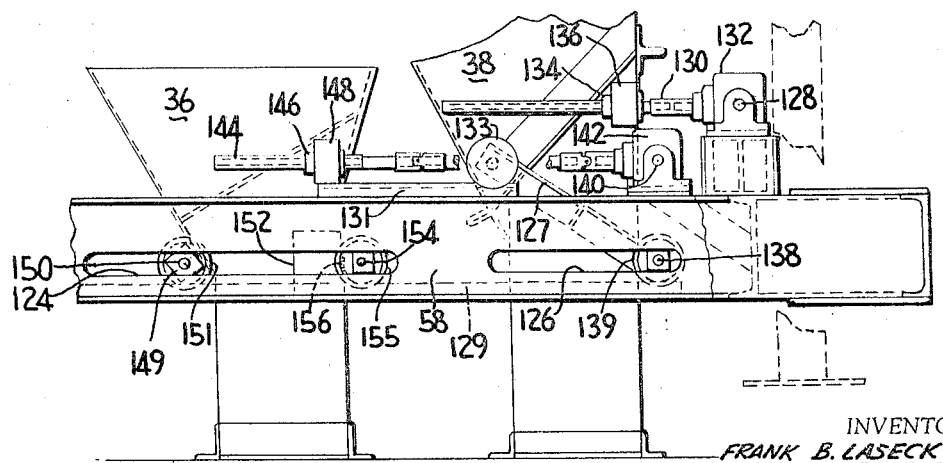

INVENTORS
FRANK B. LASECK and
BY WALTER J. RESSLER, JR.

Oscar L. Spencer
ATTORNEY

United States Patent Office 3,294,518
Patented Dec. 27, 1966

3,294,518
APPARATUS FOR TEMPERING BENT
GLASS SHEETS
Frank B. Laseck, Natrona Heights, and Walter J. Ressler, Jr., Pittsburgh, Pa., assignors to Pittsburgh Plate Glass Company, Pittsburgh, Pa., a corporation of Pennsylvania
Filed July 19, 1963, Ser. No. 296,279
10 Claims. (Cl. 65—348)

This application relates to apparatus for tempering bent glass sheets, and particularly concerns apparatus for tempering elongated glass sheets bent into non-uniform curvatures along their longitudinal axis, particularly glass sheets having bends including a gently bent portion and a sharply bent end portion adjacent thereto. The apparatus also is suitable for bending glass sheets having both end portions sharply bent relative to a central portion of comparatively gentle curvature.

The present invention is especially designed to provide apparatus for tempering curved glass sheets of various sizes and shapes and to be accommodated readily for changes in pattern of sheets to be tempered.

In recent years, automotive designs have used curved glass sheets of increasing complexity. Particularly complex curvatures have been imparted to glass sheets utilized as backlights of automobiles and as rear quarter lights of station wagons. In automobile backlights, the glass is bent longitudinally into a central portion of comparatively shallow curvature merging near its extremities into sharply bent end portions. In rear quarter lights for station wagons, the glass sheet has a major portion that is substantially flat or at most only gently curved terminating in a very sharply bent end portion.

The basic process of tempering glass is old and described in prior art patents. Such process comprises heating a glass sheet above its annealing range and then rapidly cooling the surfaces of the glass sheet to set the latter while the center is still hot. This action results in the glass sheet developing a stress pattern wherein its surfaces are stressed in compression and the intermediate portion is stressed in tension.

The surface stressed in compression makes the sheet much stronger than untempered glass because glass is much more able to withstand external forces when it is stressed in compression than when it is stressed in tension. Moreover, when the outer surface or compression skin of the glass sheet is penetrated, the tension stresses locked up within the glass cause it to shatter into a large number of relatively harmless, smoothly surfaced pieces. In contrast, annealed glass is fractured more easily, and when fractured, breaks into relatively dangerous, large, jagged fragments. The uniformity of size of the shattered particles indicates the uniformity of temper of the glass. The smaller smoother particles of shattered tempered glass are much safer than the jagged fragments of shattered untempered glass.

According to conventional operations, the glass sheet is heated nearly to its softening point and then quickly quenched by uniformly exposing the opposite surfaces of the heated glass sheets to streams of a fluid, such as air, arranged to cool both surfaces uniformly and simultaneously. The fluid is dispensed through two series of nozzles, one series facing one surface of the bent glass sheet and the other series facing the other surface of the bent glass sheet. The even distribution of the cooling air on the glass surfaces is a prerequisite to uniform tempering and is usually accomplished by blasting the air through a plurality of uniformly spaced, elongated nozzles.

According to a preferred prior art technique, a bent glass sheet is moved out of a furnace immediately after bending and supported intermediate upper and lower narrow elongated, curvilinear nozzles extending lengthwise parallel to the curved length of the glass sheet. The nozzles are reciprocated transversely of their length through an amplitude sufficient to insure that each increment of the width dimension of the glass sheet is swept by at least one of the reciprocating nozzles. The distance between the nozzle orifices and the adjacent glass sheet surface is preferably kept as uniform as possible in order to promote uniform quenching.

Prior art tempering apparatus provided with slot nozzles having curved orifices facing the glass had a shape conforming to that of a particular high production pattern. Thus, every time a pattern was changed in production, it became necessary either to accept non-uniform quenching resulting from non-uniform spacing between different portions of the nozzle orifices and different portions of the adjacent glass sheet surfaces, or, as an alternative, it became necessary to lose considerable time otherwise spent in production to replace the nozzles with others conforming to the configuration of the new pattern of glass sheets to be tempered. Neither alternative was satisfactory.

The non-uniform tempering caused the portions of the glass sheet most remote from the nozzle orifices to be weaker than desired. If the weakest portion of the tempered article were sufficiently tempered, it was necessary to employ far more tempering fluid than was necessary in the other regions of the glass sheet to produce an acceptable commercial article. Employment of air in excess of minimum overall requirements caused overloading of the blowers and required more frequent maintenance and replacement of the compressors or use of larger, more expensive equipment than was desired.

Apparatus employing the present invention preferably comprises a source of tempering fluid and at least two conduits for supplying fluid to each side of a bent glass sheet. Each conduit flares outward to form a nozzle box comprising a set of relatively narrow, elongated, parallel nozzles having curvilinear orifices and a set of elongated recesses having a width greater than that of the nozzles intermediate said elongated nozzles. An adjacent nozzle box formed by flaring the other conduit has its nozzles aligned with the elongated recesses of the other nozzle box and vice versa. The nozzle boxes provide one series of nozzles through which fluid is applied to one surface of the bent glass sheet.

The conduits for supplying fluid to the other side of said bent glass sheet also flare outward to form nozzle boxes comprising spaced, elongated, parallel nozzles having curvilinear orifices separated by relatively wide recesses. Adjacent nozzle boxes for quenching the other glass surface have nozzles of one nozzle box aligned with the recesses of an adjacent nozzle box, and vice versa. The latter nozzle boxes provide a second series of nozzles through which fluid is applied to the other surface of the bent glass sheet.

The orifices of the series of nozzles for quenching one surface of the bent glass sheet are spaced from the orifices of the series of nozzles for quenching its other surface to form a curvilinear space or chamber having open ends. Means is provided to support a curved glass sheet in the curvilinear space between nozzle orifices. The apparatus also includes means to provide relative movement between said curved glass sheet supported in the curved space and said orifices in a direction transverse to the length of the elongated nozzles while supplying tempering fluid under pressure to the nozzles.

The length of each nozzle box is less than that of the curvilinear space or chamber. The dimension of each conduit communicating with one of the nozzle boxes parallel to the length of the nozzle box is considerably less than that of the nozzle box. The total dimension of the conduits in the direction of the length of the nozzles of the nozzle boxes is considerably less than the straight line distance of the curvilinear space.

Means is provided for adjusting the position of each nozzle box. When the nozzle boxes are moved to their proper position, their nozzles face the entire length and the entire width of the longitudinally curved space, and conform the curved longitudial dimension of the space to the shape of a bent glass sheet supported therein.

A specific embodiment of the present invention comprises a series of upper nozzle boxes and a series of lower nozzle boxes. Jacks are included for adjusting the vertical position of the upper nozzle boxes. Four sets of lower nozzle boxes are provided with their nozzles and recesses arranged in alternate planes. The two intermediate lower nozzle boxes are arranged for pivotal movement as well as longitudinal positional adjustment, while the endmost lower nozzle boxes are arranged for longitudinal positional adjustment only. The nozzles of each lower nozzle box are aligned with the recesses of each adjacent lower nozzle box.

The various freedoms of adjustment enumerated above furnish a quick and easy method for adjusting the longitudinal curvature of the space between the series of nozzles formed by the upper nozzle boxes and the series of nozzles formed by the lower nozzle boxes to conform to that of the bent glass sheets to be tempered.

In order to understand the present invention more clearly, an illustrative embodiment will be described. In the drawings which form part of the description and wherein like reference numbers refer to like structural elements, FIG. 1 is an end elevation of an illustrative tempering apparatus conforming to the present invention;

FIG. 2 is a fragmentary plan section of an element of the apparatus taken along the lines II—II of FIG. 1;

FIG. 3 is an enlarged view of a portion of the apparatus shown in FIG. 1;

Figure 4:
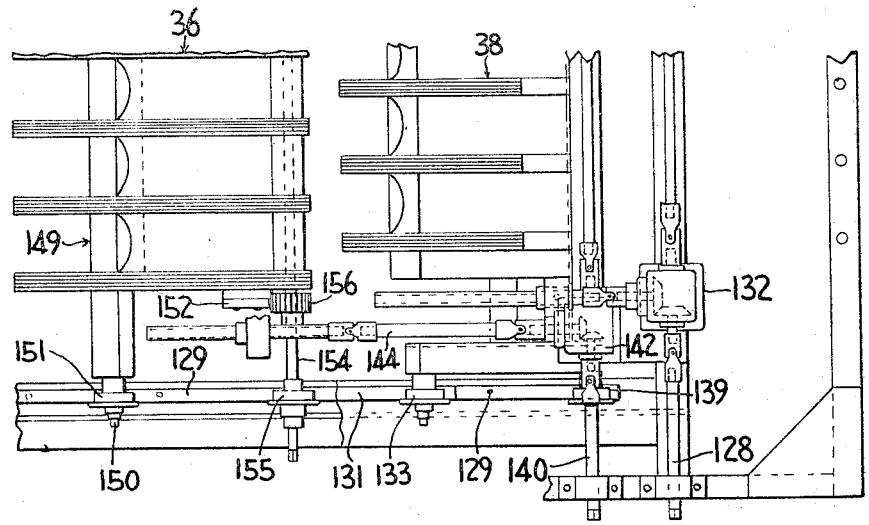
FIG. 4 is a plan fragmentary view of a portion of the enlarged apparatus seen in elevation in FIG. 3.

Referring to the drawings, a typical embodiment of tempering apparatus according to the present invention comprises an upper plenum system 10 and a lower plenum system 12. Each of the plenum systems 10 and 12 is supplied with air from the source of pressurized air such as a fan or compressor not shown.

The upper plenum system 10 comprises a pair of conduits 14, each connected through a flexible connection 16 to a narrow conduit extension 17. Each of the latter flares outwardly to form an elongated upper nozzle box 18 or 20. A control valve (not shown) is incorporated in the passage leading to each of the nozzle boxes in order to control the rate of flow of air under pressure. Each conduit 14, the flexible connection 16 and the narrow conduit extension 17 with which it communicates forms a flexible fluid supply means for each upper nozzle box.

The lower plenum system 12 comprises a pair of conduits 22 which communicates with the main source of air through passages 24. The conduits 22 extend downward on either side of the tempering apparatus and below a floor supporting the tempering apparatus to form a pair of horizontal passages 26. Each horizontal passage 26 is bifurcated to form a pair of upwardly directed passages 28. The upper end of the upwardly directed passages 28 each open into a flexible coupling 30 that interconnects with a narrow conduit extension 31. Each of the latter flares outward and upward to form one of a series of lower nozzle boxes 32, 34, 36, and 38 for each lower flexible fluid supply means comprising a passage 28, a flexible coupling 30, and conduit extension 31.

Figure 5:
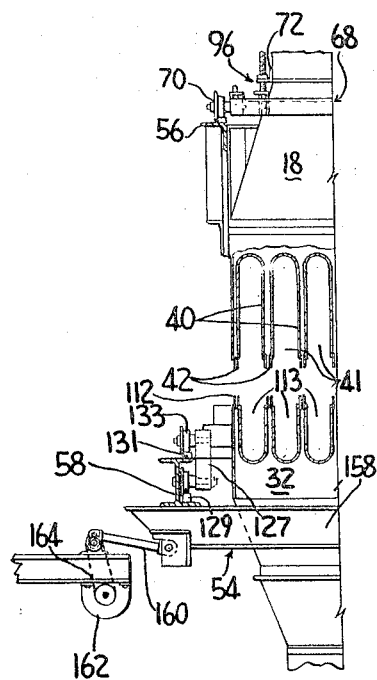
FIG. 5 is a fragmentary view showing how the apparatus is reciprocated during tempering.

Each of the upper nozzle boxes 18 and 20 comprises a set of relatively narrow, parallel, elongated nozzles 40 separated by relatively wide, parallel recesses 41 (FIG. 5). Each nozzle 40 has a curved bottom orifice 42. Nozzles 40 are disposed in planes equally spaced from one another. The ends of the curved bottom orifices 42 are depicted by reference characters 44 and 46 in FIG. 1.

The upper nozzle box 20 is provided with a set of narrow, parallel, elongated nozzles separated by relatively wide parallel recesses 47 (FIG. 6) and having curved bottom orifices 48 extending from one end 50 to another end 52 thereof. The curved bottom orifices 42 and 48 are the mirror image of one another.

The orifices 48 of the nozzles of upper nozzle box 20 are located in parallel planes intermediate and equidistant from the planes occupied by nozzles 40 and in alignment with recesses 41. Nozzles 40 are in alignment with recesses 47.

A frame support structure depicted generally by reference character 54 (FIG. 1) comprises front and rear upper horizontal beams 56 (only the front beam of which is shown) and front and rear lower horizontal I-beams 58 (FIGS. 1 and 3). Vertical beams 59 interconnect the corresponding ends of the upper beams 56 and the lower beams 58 to form the frame support structure 54.

Vertical posts 60 support conveyor stub rolls 62. The vertical posts 60 are separated from one another a sufficient distance to provide clearance for the frame support structure 54 to reciprocate in a direction parallel to the axis of movement defined by the conveyor formed by the conveyor stub rolls 62. The details of the drive mechanism for the conveyor structure are not shown in this application because they are conventional and well known in the art.

A horizontal track rail 66 is disposed at the upper surface of each upper horizontal beam 56 as is shown clearly in FIG. 2. A pair of carriages 68, each having wheels 70 supported for rolling along each of the horizontal tracks 66, are movable along the length of the parallel tracks 66 formed on the upper surfaces of the upper horizontal beams 56.

Each carriage 68 comprises a carriage frame 71 rigidly attached to the upper portion of one of the conduit extensions 17 by nut and bolt attachments 72 (FIG. 1).

A rotating externally threaded rod 74 (FIG. 2) is mounted on an internally threaded sleeve 76 carried by a bracket 78 which is secured to one of the sides of the carriage 68 by nut and bolt connections 79. Rod 74 is connected by means of a universal joint 80 to a rod section 82 which is rigidly attached to a bevel gear 84 in a gear box 86.

An actuating rod 88 having a square extension 90 at its accessible end extends through a bearing housing 92 mounted on the end of upper front horizontal beam 56. A bevel gear 94 is attached to actuating rod 88 at its inner end. Bevel gear 94 meshes with the bevel gear 84 within gear box 86.

Applying a wrench to the square extension 90 of actuating rod 88 rotates the latter. As the latter is rotated, the gears 94 and 84 mesh, causing the externally threaded rod 74 to rotate relative to the internally threaded sleeve 76. This rotation causes the carriage 68 to be displaced along tracks 66, which are also identified as upper track means. It is noted again at this point that the upper portion of the apparatus depicted in FIG. 2, which was omitted, includes an additional horizontal beam similar to upper horizontal beam 56 containing a track 66. Thus, the carriage 68 can be adjusted in position longitudinally of the upper tracks 66 to displace the upper nozzle boxes 18 and 20 rigidly connected to the carriages 68 through conduit extensions 17. The flexible connections 16 between the conduits 14 and the extensions 17 communicating with the corresponding nozzle chambers 18 and 20 permit this freedom of movement for the upper nozzle chambers.

The vertical position of the upper nozzle boxes 18 and 20 are also capable of adjustment. A set of jacks 96 is mounted on the carriage 68 with one jack at each of the four corners of each carriage 68. A crank 98 is attached to one end of a jointed shaft 100 to rotate the latter. At its opposite end, jointed shaft 100 is provided with a sprocket wheel 102 which rotates therewith. A chain 104 engages sprocket wheel 102 with another sprocket weel 106. The latter in turn is attached to one end of an additional jointed shaft 108 to cause the latter to rotate therewith. Each of the jointed shafts is connected to one of the jacks 96 adjacent each of its longitudinal extremities.

Upon rotating the crank 98, each of the jacks 96 is caused to move vertically to displace the carriage frame 71 of the carriage 68 relative to the axles upon which wheels 70 are mounted. The upper nozzle box 18 or 20 moves vertically with its associated carriage frame 71.

It will be seen from the above that each of the upper nozzle chambers 18 and 20 is provided with means for positioning the latter where desired along the axis provided by the tracks 66. In addition, the jacks 96 provide vertical movement to permit the arcuate bottom orifices 42 and 48 of the nozzles of the upper nozzles boxes 18 and 20 to define a curvature conforming substantially to the upper surface of a glass sheet to be quenched. In fact, the bottom orifices 42 and 48 define a curved roof of a curved chamber or space within which a curved glass sheet is supported during tempering.

Figure 6:
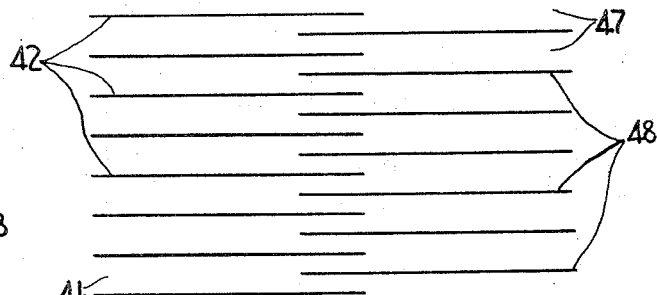
FIG. 6 is a schematic plan view of a typical operative arrangement of the upper series of nozzles and recesses facing the upper surface of a bent glass sheet during temper.

FIG. 6 shows how the curved bottom orifices 42 of the upper nozzle box 18 are arranged with respect to the orifices 48 of the upper nozzle box 20. It is seen from this view that the orifices of each nozzle box are disposed in vertical planes parallel to one another and that the nozzle orifices 42 of nozzle box 18 are offset from the orifices 48 of the nozzles for the upper nozzle box 20. Thus, the set of nozzles from upper nozzle box 18 interfit between the set of nozzles from upper nozzle box 20 to form the roof of a curved chamber or space receiving a bent glass sheet to be tempered. The curved chamber has open ends and is completely within the frame support structure 54.

Figure 7:
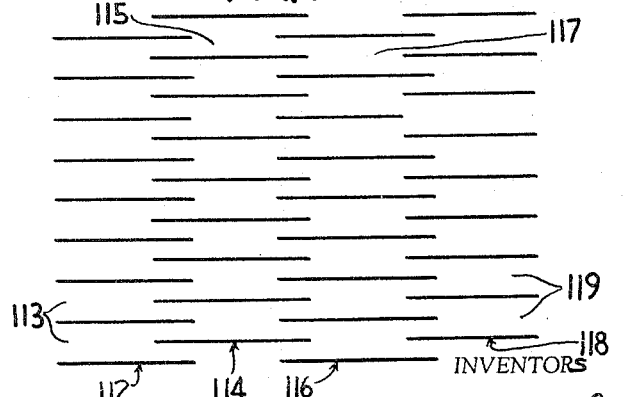
FIG. 7 is a schematic plan view of a typical operative arrangement of the lower series of nozzles and recesses facing the bottom surface of a bent glass sheet during tempering.

Each of the lower nozzle boxes 32, 34, 36, and 38 is provided with a set of parallel nozzles extending in a direction parallel to the direction of the series of nozzles for the upper nozzle boxes 18 and 20. The lower series of nozzles are located in the upper ends of the respective lower nozzle boxes. FIG. 7 shows a typical arrangement of the nozzles for lower nozzle boxes 32, 34, 36, and 38.

In the drawing of FIG. 7 a set of relatively narrow nozzles 112 separated by relatively wide grooves 113 is provided for lower nozzle box 32, a set of relatively narrow nozzles 114 separated by relatively wide grooves 115 is provided for lower nozzle box 34, a set of relatively narrow nozzles 116 separated by relatively wide grooves 117 is provided for lower nozzle box 36, and a set of relatively narrow nozzles 118 separated by relatively wide grooves 119 is provided for lower nozzle box 38. The nozzles in each lower nozzle box are curved lengthwise and extend upward in parallel planes. The nozzles in each adjacent lower nozzle box are offset with respect to one another and are aligned with the grooves of the adjacent lower nozzle box.

Each of the lower nozzle boxes 32, 34, 36, and 38 is adjustable in position in a direction parallel to that provided for adjusting the position for the upper nozzle boxes 18 and 20. The lower horizontal I-beams 58 of the frame support structure 54 are provided with longitudinal slots 120, 122, 124, and 126. Since the structure for adjusting the position of lower nozzle boxes 32 and 34 is the mirror image of that provided for adjusting the position of lower nozzle boxes 36 and 38, in FIG. 3 only, the latter two are disclosed in greater detail.

For adjusting the position of lower nozzle box 38, an actuating rod 128 similar in structure to actuating rod 88 is provided. Actuating rod 128 is geared to a driven rod 130 by means of bevel gears located within a gear box 132. Driven rod 130 is externally threaded within an internally threaded sleeve 134. The latter in turn is supported on a bearing housing 136 which is attached to the wall of nozzle box 38. A rod 138 is received by slot 126 and forms an extension of an axle of a lower wheel 139 of a tilted carriage 127 rigidly attached to the lower nozzle box 38.

The lower flange of I-beam 58 supports a horizontal track 129. The upper flange of I-beam 58 supports an additional horizontal track 131 at each end thereof. Tracks 129 and 131 are identified respectively as lower and upper track means. An upper wheel 133 of tilted carriage 127 is rotatably supported on upper track 131 while lower wheel 139 is free to traverse lower track 129 a distance limited by the dimensions of slot 126. The actuating rod 128 is rotated to adjust the position of the lower nozzle box 38.

A similar actuating rod 140 is geared in a gear box 142 to a driven rod 144 which is jointed. The latter has its inner portion externally threaded for receipt within an internally threaded sleeve 146 carried by a bearing housing 148.

A bracket 149 supporting an axle 150 is rigidly attached to the lower nozzle box 36. The axle 150 extends through the slot 124. A wheel 151 rotates on axle 150 and is supported on the track 129.

A rack 152 is rigidly attached to the outer wall of lower nozzle box 36. A rotatable rod 154 rotates with a gear 156 relative to the rack 152 to pivotally adjust the angular orientation of the lower nozzle box 36. Rod 154 also serves as an axle for wheel 155, which also rides on track 129. A lock (not shown) may be included to lock the gear 156 in any desired position along the rack 152.

When the gear 156 is rotated with respect to rack 152, the lower nozzle box 36 is rotated about a pivot provided by axle 150. This freedom of rotation permits some provision for adjusting the orientation of the sheets of cold air dispensed through the intermediate sets of nozzles of the lower series of nozzles toward the lower surface of the bent glass sheet.

Actuating rod 140 controls the horizontal position of lower nozzle box 36 in a manner similar to the manner in which actuating rod 128 controls the position of lower nozzle box 38.

The adjusting means for lower nozzle boxes 32 and 34 are similar to those provided for lower nozzle boxes 36 and 38, respectively. Thus, each of the lower nozzle boxes can be adjusted to provide for a curved bottom wall for the curved space receiving a bent glass sheet between the upper and lower plenum systems.

A sheet of glass G is supported on a bending and tempering mold M. The latter is supported on a carriage C, whose carriage rails are supported along the stub rolls 62 of the conveyor which conveys the belt glass sheets into and out of the tempering apparatus after it has been heated.

The frame support structure 54 has a centrally disposed member 158 (FIG. 5) pivotally attached to the end of a crank arm 160. The crank is operated from a motor 162 by means of a drive 164 to reciprocate the frame 54 and the respective nozzle boxes 18, 20, 32, 34, 36, and 38 in a direction transverse to the direction of the tracks 66, 129, and 131. The tracks extend substantially parallel to the length of the nozzles at the discharge end of the nozzle boxes. Slides 166 (FIG. 1) are rigidly attached to and interconnected reinforcements 167 for the bottom of the lower horizontal beams 58. These slides ride on greased rails 168, which extend in a direction normal to that of the track means 66, 129, and 131.

When a heated glass sheet is disposed between upper and lower plenum systems 10 and 12, the air supply is turned on and air is imparted under pressure through the elongated nozzles of the upper nozzle chambers 18 and 20 and the lower nozzle chambers 32, 34, 36, and 38. The crank attachment to the frame support structure 54 causes the entire system of tempering nozzles to reciprocate in unison in the direction of the greased rails 168. The adjustment of the positions of the various upper nozzle boxes 18 and 20 and lower nozzle boxes 32, 34, 36, and 38 is made only where necessary because of a change in the pattern being produced.

Adjustment of the length and curvature of the curvilinear chamber between the upper nozzle boxes and the lower nozzle boxes is made possible by the fact that the conduit or nozzle box portion engaged by the respective carriages have a total length less than that of the open-ended chamber which receives the glass for tempering. This specific structure and the carriage arrangement permits adjustment of the position of each carriage along the track means. The nozzles of adjacent nozzle boxes are free to overlap when the length of the chamber is shortened. The shape of the chamber conforms to the composite shape of the partly overlapped nozzle sets.

When this apparatus was first proposed, it was feared that transverse streaks would be imposed in the tempered glass in the areas exposed to overlapping end portions of adjacent nozzle sets. Provision was made to shield the overlapping portion of one of the adjacent nozzle sets. However, a few experiments showed that the overlapping ends produced a beneficial rather than a detrimental result. The additional air applied under pressure to the central region of the curved space helps produce a force to move the air in an outward direction from the area or areas of overlapping toward the open ends of the curvilinear chamber between nozzle series. This force helps remove the air from between the bent glass sheet surfaces and the nozzle orifice more rapidly than is the case when there is no overlapping of adjacent nozzle sets and the air is supplied uniformly over the entire glass sheet surfaces.

The form of the invention shown and disclosed herein represents a preferred illustrative embodiment thereof. It is understood that various changes can be made without departing from the spirit of the invention as defined in the claimed subject matter which follows.

What is claimed is:

1. Apparatus for tempering curved glass sheets comprising a frame, means for supporting a heated, bent glass sheet within said frame, a first series of nozzle boxes located on one side of a position occupied by a glass sheet supported within said frame, a second series of nozzle boxes located on the opposite side of said position, each nozzle box comprising a set of parallel, elongated, relatively narrow nozzles separated by relatively wide elongated recesses, each nozzle having a curved, elongated orifice opening onto said position, the orifices of the nozzles of the first series of nozzle boxes being spaced from the orifices of the nozzles of the second series of nozzle boxes to form an open-ended curvilinear chamber therebetween, a relatively narrow flexible conduit communicating with each nozzle box, means to furnish tempering fluid to each nozzle box through its associated narrow flexible conduit, each nozzle box having a length less than the length of said curvilinear chamber, the total length of the nozzle boxes in each said series being greater than the length of said curvilinear space, the total dimension of the conduits communicating with each series of nozzle boxes in the direction of the length of the nozzles being less than the length of said curvilinear space, the nozzles of each nozzle box in each series of nozzle boxes being aligned with the recesses of each nozzle box of said series adjacent thereto, means interconnecting each said nozzle box to said frame and for adjusting the position of each said nozzle box in the direction of the length of said nozzles relative to said frame and means connected to said frame for reciprocating said frame in a direction transverse to the length of said nozzles.

2. Apparatus as in claim 1, wherein said first series of nozzle boxes comprises an upper series of nozzle boxes and said second series of nozzle boxes comprises a lower series of nozzle boxes, the orifices of the nozzles of said upper nozzle boxes opening downward on said curvilinear space, the orifices of the nozzles of said lower nozzle boxes opening upward on said curvilinear space, and jack means is provided for adjusting the vertical position of each upper nozzle box relative to said frame.

3. Apparatus as in claim 1, wherein said first series of nozzle boxes comprises an upper series of nozzle boxes and said second series of nozzle boxes comprises a lower series of nozzle boxes, the orifices of the nozzles of said upper nozzle boxes openig downward on said curvilinear space, the orifices of the nozzles of said lower nozzle boxes opening upward on said curvilinear space, said lower series of nozzle boxes comprises a pair of end lower nozzle boxes and a pair of intermediate lower nozzle boxes, and means connects each said intermediate lower nozzle box to said frame for pivotable adjustment of said intermediate lower nozzle box about an axis substantially normal to the length of said nozzles.

4. Appartus for tempering curved glass sheets comprising a frame comprising upper and lower horizontal beams supporting parallel upper and lower horizontal track means, at least two carriages having wheels supported by each of said track means, each carriage comprising a carriage frame engaging the periphery of a relatively narrow, flexible fluid supply means, a nozzle box communicating with each said supply means and comprising a set of relatively narrow, elongated parallel nozzles separated by relatively wire grooves extending lengthwise in a direction substantially parallel to said track means, the nozzle boxes comprising a series of upper nozzle boxes, each of said upper nozzle boxes being independently associated with a different carriage supported along said upper track means and having its nozzles provided with orifices opening downward, and a series of lower nozzle boxes, each of said lower nozzle boxes being independently associated with a different carriage supported along said lower track means and having its nozzles provided with orifices facing upward, means connecting each carriage to said frame for adjusting the position thereof relative to another carriage along its associated track means, and means for reciprocating said frame in a direction transverse to the direction of said track means, the nozzles of each of said nozzle boxes in each series of nozzle boxes being aligned with the relatively wide grooves of each nozzle box of said series adjacent thereto.

5. Apparatus as in claim 4, further including jack means for adjusting the vertical position of each carriage frame and its associated upper nozzle box relative to each carriage supported on said upper track means.

6. Apparatus as in claim 4, further including rack means carried by at least one of said lower nozzle boxes and gear means carried by one of said carriages supported along said lower track means and engaging said rack means to adjust the orientation of said one of said lower nozzle boxes about a horizontal axis.

7. In apparatus for tempering curved glass sheets comprising a source of tempering fluid, a series of upper elongated nozzles having curved bottom orifices, a series of lower elongated nozzles having curved upper orifices spaced below said curved bottom orifices to provide a curvilinear space between said orifices, means for supplying tempering fluid under pressure from said source to said nozzles, means to support a curved glass sheet in said curved space, and means to provide relative movement between said curved glass sheet and said orifices in a direction transverse to the length of said nozzles while supplying tempering fluid under pressure to said nozzles, the improvement wherein each said series of nozzles comprises at least a pair of sets of parallel nozzles, the nozzles of one set of said pair extending only a portion of the curved length of said curved space, the nozzles of the other set of said pair extending only a portion of the curved length of said space and at least partially offset longitudinally from the portion of said curved length occupied by said one set, the nozzles of said one set being located in spaced parallel planes, the nozzles of said other set being located in planes transversely spaced and intermediate the plane occupied by the nozzles of said one set, longitudinal grooves intermediate adjacent nozzles of each set of each series aligned with nozzles of an adjacent set of said series, and means for adjusting the position of each set of nozzles longitudinally thereof in unison to conform the curvilinear space between said upper and lower series of nozzles to the shape of a bent glass sheet supported in said curvilinear space.

8. In apparatus for tempering curved glass sheets, an open-ended chamber, at least two flexible conduits disposed on one side of said chamber, at least two other flexible conduits disposed on the other side of said chamber, each of said conduits communicating with a source of tempering fluid at one end and a nozzle box having a set of spaced, relatively narrow, parallel elongated nozzles with curved orifices opening onto said chamber and relatively wide, elongated recesses between adjacent nozzles, means to support a bent glass sheet within said chamber, and means to reciprocate said nozzle boxes in unison in a direction transverse to the length of said elongated nozzles, the improvement wherein each conduit is flared in the direction of the length of said nozzles to form one of said nozzle boxes, the nozzles in one nozzle box being located in alignment with the recesses provided between the nozzles of the other nozzle box adjacent to said one nozzle box, and means attached to each nozzle box to adjust the position of said nozzle box relative to that of the other nozzle box to modify the composite shape of the nozzles to conform the shape of said chamber of the shape of a bent glass sheet to be received within said chamber.

9. Apparatus for tempering curved glass sheets comprising a frame, means for supporting a heated, bent glass sheet within said frame, a first series of nozzle boxes located on one side of a position occupied by a glass sheet supported within said frame, a second series of nozzle boxes located on the opposite side of said position, each nozzle box comprising a set of parallel, elongated, relatively narrow nozzles separated by relatively wide elongated recesses, each nozzle having a curved, elongated orifice opening onto said position, the orifices of the nozzles of the first series of nozzle boxes being spaced from the orifices of the nozzles of the second series of nozzle boxes to form an open-ended curvilinear chamber therebetween, means to furnish tempering fluid to each nozzle box, each nozzle box having a length less than the length of said curvilinear chamber, the total length of the nozzle boxes in each said series being greater than the length of said curvilinear space, the nozzles of each nozzle box in each series of nozzle boxes being aligned with the recesses of each nozzle box of said series adjacent thereto, means interconnecting each said nozzle box to said frame and for adjusting the position of each said nozzle box in the direction of the length of said nozzles relative to said frame and means connected to said frame for reciprocating said frame in a direction transverse to the length of said nozzles.

10. Appartus for tempering curved glass sheets comprising a frame, means for supporting a heated, bent glass sheet within said frame, a first series of nozzle boxes located on one side of a position occupied by a glass sheet supported within said frame, a second series of nozzle boxes located on the opposite side of said position, each nozzle box comprising a set of parallel, elongated, relatively narrow nozzles separated by relatively wide elongated recesses, each nozzle having a curved, elongated orifice opening onto said position, the orifices of the nozzles of the first series of nozzle boxes being spaced from the orifices of the nozzles of the second series of nozzle boxes to form an open-ended curvilinear chamber therebetween, means to furnish tempering fluid to each nozzle box, each nozzle box having a length less than the length of said curvilinear chamber, the total length of the nozzle boxes in each said series being greater than the length of said curvilinear space, the nozzles of each nozzle box in each series of nozzle boxes being aligned with the recesses of each nozzle box of said series adjacent thereto, and means interconnecting each said nozzle box to said frame and for adjusting the position of each said nozzle box in the direction of the length of said nozzles relative to said frame.

References Cited by the Examiner
UNITED STATES PATENTS

| | | | |
|---|---|---|---|
| 2,263,679 | 11/1941 | Ferre | 65—348 |
| 2,646,647 | 7/1953 | Bamford et al. | 65—348 X |

DONALL H. SYLVESTER, *Primary Examiner.*

A. D. KELLOGG, *Assistant Examiner.*